US010820592B2

(12) United States Patent
Bristow

(10) Patent No.: US 10,820,592 B2
(45) Date of Patent: Nov. 3, 2020

(54) METHOD FOR TREATING FUNGAL INFECTIONS, FUNGICIDAL COMPOSITIONS AND THEIR USE

(75) Inventor: James Timothy Bristow, Hong Kong (CN)

(73) Assignee: ROTAM AGROCHEM INTERNATIONAL CO., LTD., Hong Kong (CN)

( * ) Notice: Subject to any disclaimer, the term of this patent is extended or adjusted under 35 U.S.C. 154(b) by 565 days.

(21) Appl. No.: 13/576,505

(22) PCT Filed: Feb. 1, 2011

(86) PCT No.: PCT/CN2011/070870
§ 371 (c)(1),
(2), (4) Date: Aug. 1, 2012

(87) PCT Pub. No.: WO2011/095134
PCT Pub. Date: Aug. 11, 2011

(65) Prior Publication Data
US 2012/0302559 A1   Nov. 29, 2012

(30) Foreign Application Priority Data
Feb. 5, 2010 (BR) .................................. 1000361

(51) Int. Cl.
*A01N 43/653* (2006.01)
*A01N 43/78* (2006.01)
*A01N 47/18* (2006.01)

(52) U.S. Cl.
CPC .......... *A01N 43/653* (2013.01); *A01N 43/78* (2013.01); *A01N 47/18* (2013.01)

(58) Field of Classification Search
CPC ....... A01N 43/653; A01N 43/78; A01N 47/48
See application file for complete search history.

(56) References Cited

U.S. PATENT DOCUMENTS

| 6,020,354 A | 2/2000 | Assmann et al. |
| 2004/0047928 A1* | 3/2004 | Baron .................. A01N 65/00 424/761 |
| 2007/0053944 A1 | 3/2007 | Vermeer |
| 2008/0269051 A1 | 10/2008 | Suty-Heinze et al. |

FOREIGN PATENT DOCUMENTS

| CN | 1947510 A | 4/2007 |
| CN | 101379984 A | 3/2009 |
| CN | 101401574 A | 4/2009 |
| WO | WO 2004035589 A1 * | 4/2004 |
| WO | WO-2006/096949 A2 | 9/2006 |
| WO | WO-2007/009775 A2 | 1/2007 |
| WO | WO-2008/095913 A2 | 8/2008 |
| WO | WO-2008/096005 A1 | 8/2008 |
| WO | WO-2008/110274 A2 | 9/2008 |

OTHER PUBLICATIONS

Cromey et al., New Zealand Plant Protection, 2002, vol. 55, pp. 341-346.*
Deising et al., "Mechanisms and Significance of Fungicide Resistance", Brazilian J. Microbiology, 2008, vol. 39, pp. 286-295.*
Zhang et al., "Effects of fungicides JS399-19, azoxystrobin, tebuconazole, and carbendazim on the physiological and biochemical indices and grain yield of winter wheat", Pesticide Biochemistry and Physiology, 2010, vol. 98, No. 2, pages (Year: 2010).*
International Search Report and Written Opinion for PCT/CN2011/070870, dated May 12, 2011; ISA/CN.

* cited by examiner

Primary Examiner — Sikarl A Witherspoon
Assistant Examiner — Stephanie K Springer
(74) Attorney, Agent, or Firm — Dickinson Wright PLLC

(57) ABSTRACT

A fungicidal composition and a method for treating plants using the composition are provided. The composition comprises at least three active ingredient components (A), (B) and (C), optionally together with one or more customary formulation auxiliaries, wherein component (A) is one or more triazole fungicides, component (B) is one or more strobilurin fungicides, and component (C) is one or more benzimidazole fungicides. Further provided is a method for preventing and/or combating pathogenic damage or pest damage in a plant or plant material, which comprises applying on the plant, plant material, part of plant, or surroundings thereof the composition comprising the active ingredient components (A), (B) and (C).

11 Claims, No Drawings

METHOD FOR TREATING FUNGAL INFECTIONS, FUNGICIDAL COMPOSITIONS AND THEIR USE

CROSS-REFERENCE TO RELATED APPLICATIONS

The present invention is a 371 U.S. National State of International Application No. PCT/CN2011/070870, filed on Feb. 1, 2011. This application claims priority to Brazilian Patent Application No. PI1000361-4, filed on Feb. 5, 2010. The contents of the above applications are herein incorporated by reference in their entirety.

The present invention relates to a method of treating plants and plant material to combat or prevent fungal infestations. The present invention further relates to fungicidal compositions and their use in controlling fungal infections of plants.

BACKGROUND

The protection of crops against fungi and other pests requires the application of chemical compositions which protect or combat directly or indirectly the causing agent. These products are called agrochemicals. Agrochemicals are generally provided as formulations comprising an active ingredient (pesticide) and a mixture of other agents, for example inert agents and/or adjuvants, aiming at ensuring the biological efficacy of the formulation.

By way of example of pests impacting crops are *Phakopsora pachyrhizifungus*, which affects soybean, and the disease caused is known as "soybean rust". According to estimates, more than 75% of such crops may be affected if this pathogen is not controlled and is allowed to develop unchecked. The prevention and treatment against the infestation of these pests is made by the application of a fungicide-containing agrochemical product.

Agrochemicals may be provided in the form of several different formulations, such as: suspension concentrates, suspoemulsions, soluble concentrates, emulsifiable concentrates.

Numerous suspension concentrates or suspoemulsioins of agrochemically active compounds are already known. Thus, suspension concentrates (SC) or suspoemulsions (SE) of tebuconazole, azoxystrobin, or a combination of a triazole and a strobilurin, such as Azoxystrobin and Cyproconazole SC or Pyraclostrobin and Epoxiconazole SE, have been commercial products. It has been found that the suspension concentrate or suspoemulsion formulation of the combination of a triazole and a strobilurin has a higher activity than the corresponding single compound suspension concentrate or suspoemulsion when diluting with water. Mixture of different biologically active compounds can have a broader spectrum of activity than a single compound alone. Furthermore, these can exhibit a synergistic effect compared with the single active ingredient. For environmental reasons, suspension concentrates and suspoemulsions are two preferred formulations for many pesticidally active compounds. However the combination of a strobilurin and a triazole, such as Azoxystrobin and Ciproconazole SC or Pyraclostrobin and Epoxiconazole SE, has the disadvantage that the activity is lower than that of sprays obtainable by diluting a triazole emulsion concentrate, such as tebuconazole emulsion concentrate, with water.

US2007/0053944 A1 provides certain novel suspension concentrates comprising at least one active compound, from the group of azoles and/or the strobilurins. It is indicated that the biological activity of the sprays obtained by diluting suspension concentrates according to the invention provided in US2007/0053944 with water come close to the activity of sprays obtainable from the corresponding emulsion concentrates. Formulations according to the invention in US2007/0053944 appear to enhance the biological activity of the active components comprised therein so that, compared to customary suspension preparations, either a higher activity is achieved or less active compound is required.

However sprays preparable by diluting the suspension concentrates or other formulations comprising the combination of a triazole and a strobilurin as the active ingredients have not been found which show a considerably better biological activity than sprays obtainable from the corresponding customary emulsion concentrates.

The formulation of active ingredients in emulsion concentrates requires considerable quantities of organic solvents such as aromatic hydrocarbons, chlorinated hydrocarbons, etc. which are known for their toxicological and ecotoxicological properties, creating toxicological and ecotoxicological problems. As noted above, it is for these reasons that alternative formulations, such SC and SE formulations, are preferred.

There is a continuing need to provide environmental fungicidal combinations, which provide, for example, improved biological properties, and/or synergistic properties, especially for controlling pathogens.

Therefore, it would be advantageous to provide a combination comprising a triazole and a strobilurin as the active ingredients which demonstrates a considerably better biological activity than the corresponding customary emulsion concentrates comprising a triazole as the active ingredient, such as tebuconazole emulsion concentrates.

Further, it would be very desirable to provide such a product that is not only friendly to the environment, but also has a better biological activity than the customary emulsion concentrates comprising a triazole as the active ingredient.

SUMMARY OF THE INVENTION

The present invention relates to a composition which provides improved pesticidal properties, for example, improved biological properties, and/or synergistic properties, especially for preventing and combating soybean rust.

Accordingly, in a first aspect, the present invention provides a pesticidal composition comprising three active ingredient components (A), (B) and (C), optionally together with one or more customary formulation auxiliaries, wherein component: (A) is at least one triazole active compound, (B) is at least one strobilurin active compound, and (C) is at least one benzimidazole active compound.

The composition preferably consists essentially of, more preferably consists of, the components (A), (B) and (C), together with one or more optional auxiliaries. However, the present invention also includes embodiments in which one or more further active ingredients is included, in addition to the components (A), (B) and (C).

The composition may be in the form of suspension concentrate (SC) or suspoemulsion (SE). In other words, the present invention provides the composition in the form of SC and/or the composition in the form of SE.

In a second aspect, the present invention provides a method of preventing and/or combating fungicidal infestation of a plant, in particular soybean rust, which comprises applying to the plant a composition as hereinbefore defined.

Accordingly, in a third aspect, the present invention provides a method of protecting a plant against pathogenic damage by applying to the plant a product comprising a composition as hereinbefore defined.

The present invention also provides in a fourth aspect a plant protecting product comprising a composition as hereinbefore defined.

The invention also relates to a plant or plant material treated with a composition defined in the fourth aspect, the plant or plant material being treated either before infestation by a fungus or treated to combat an existing fungal infection.

It has been surprisingly found that the combination of at least one triazole active ingredient (A), at least one strobilurin active ingredient (B) and at least one benzimidazole active ingredient (C) results in an unexpectedly enhanced action against fungal infestations of plants. In particular, the combination exhibits surprisingly high activity in the treatment and/or prevention of soybean rust. The increase in action and/or other advantageous properties achieved with the combination according to the invention is significantly greater than the activity to be expected by the individual components or the combination of triazole and strobilurin. The activity of the active ingredients is enhanced synergistically which, inter alia, extends the boundaries of the fungicidal activity of the compounds.

It has also been found that the use of the aforementioned active ingredients (A), (B) and (C) in combination is particularly effective in the treatment and/or prevention of fungal infestations in plants, in particular in controlling or preventing fungal infestations of soybean, especially soybean rust. Accordingly, in addition to the aforementioned compositions, this invention also provides a method of controlling fungal infestations in plants or plant material, in particular soybean, especially the control of soybean rust. The method comprises treating a site, for example a plant, with (1) at least one triazole active ingredient (A), (2) at least one strobilurin active ingredient (B) and (3) at least one benzimidazole active ingredient (C). The active ingredients (A), (B), and (C) may be applied in any desired sequence, any combination, consecutively or simultaneously. Preferably, the method is effected by applying to the plant a composition as hereinbefore defined.

The fungicidal active ingredient triazole compound (A) may be present in the composition of the present invention in any suitable amount, and is generally present in an amount of from 5% to 40% by weight of the composition, preferably from 5% to 20% by weight of the composition, more preferably from 10% to 20% by weight of the composition. For example, the triazole compound (A) may be present in an amount of 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% by weight of the composition.

The triazole compound (A) may be any fungicidally active triazole compound. For example, such compounds are known in the art and are commercially available. The triazole compound is preferably one or more selected from azaconazole, bitertanol, bromuconazole, cyproconazole, diclobutrazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, paclobutrazol, penconazole, propiconazole, prothioconazole, simeconazole, tebuconazole, tetraconazole, triadimefon, triadimenol, and triticonazole. In a particular embodiment, the triazole compound (A) is tebuconazole.

The fungicidal active ingredient strobilurin compound (B) may be present in the composition in any suitable amount, and is generally present in an amount of from 1% to 30% by weight of the composition, preferably from 4% to 10% by weight of the composition, more preferably from 5% to 10% by weight of the composition. For example, the strobilurin compound (B) may be present in an amount of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% or 30% by weight of the composition.

The strobilurin compound (B) may be any fungicidally active strobilurin compound, for example with such compounds being known in the art and commercially available. The strobilurin compound is preferably one or more selected from azoxystrobin, dimoxystrobin, famoxadone, fenamidone, fluoxastrobin, kresoxim-methyl, metominostrobin, picoxystrobin, pyraclostrobin and trifloxystrobin. In a particular embodiment, the strobilurin compound (B) is azoxystrobin.

The fungicidal active ingredient benzimidazole compound (C) may be present in the composition in any suitable amount, and is generally present in an amount of from 5% to 50% by weight of the composition, preferably from 20% to 40% by weight of the composition, more preferably from 30% to 40% by weight of the composition. For example, the benzimidazole compound (C) may be present in an amount of 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight of the composition.

The benzimidazole compound (C) may be any fungicidally active benzimidazole, for example with such compounds being known in the art and available commercially. The benzimidazole compound is preferably one or more selected from benomyl, carbendazim, fuberidazole, thiabendazole, and thiophanate-methyl. In a particular embodiment, the benzimidazole compound (C) is carbendazim.

The active components (A), (B) and (C) may be present in the composition or applied in any amounts relative to each other, to provide the enhanced or synergistic effect of the mixture. In particular, the weight ratio of any two of the components (A), (B) and (C) in the composition independently is preferably in the range of from 25:1 to 1:25, 20:1 to 1:20, or 15:1 to 1:15, more preferably 10:1 to 1:10, or 5:1 to 1:5.

In a preferred embodiment of the invention, each combination is a composition comprising, preferably (A), (B), and (C), and optionally one or more auxiliaries. The auxiliaries employed in the composition will depend upon the type of formulation and/or the manner in which the formulation is to be applied by the end user. Formulations incorporating the composition of the present invention are described hereinafter. Suitable auxiliaries which may be comprised in the composition according to the invention are all customary formulation adjuvants or components, such as organic solvents, stabilizer, anti-foams, emulsifiers, antifreeze agents, preservatives, antioxidants, colorants, thickeners and inert fillers.

The fungicidal composition optionally includes one or more surfactants which are preferably non-ionic, cationic and/or anionic in nature and surfactant mixtures which have good emulsifying, dispersing and wetting properties, depending on the nature of the active ingredient to be formulated. Suitable surfactants are known in the art and are commercially available. Suitable anionic surfactants can be both so-called water-soluble soaps and water-soluble synthetic surface-active compounds. Soaps which may be used are the alkali metal, alkaline earth metal or substituted or unsubstituted ammonium salts of higher fatty acid ($C_{10}$-$C_{22}$), for example the sodium or potassium salt of oleic or stearic acid, or of natural fatty acid mixtures. The surfactant can be an emulsifier, dispersant or wetting agent of ionic or nonionic type. Examples which may be used are salts of polyacrylic acids, salts of lignosulphonic acid, salts of phenylsulphonic or naphthalenesulphonic acids, polycondensates of ethylene oxide with fatty alcohols or with fatty acids or with fatty amines, substituted phenols, especially alkylphenols, sulphosuccinic ester salts, taurine derivatives, especially alkyltaurates, or phosphoric esters of polyethoxylated phenols or alcohols. The presence of at least one surfactant is generally required when the active ingredient and/or the inert carrier and/or auxiliary/adjuvant are insoluble in water and the vehicle for the final application of the composition is water.

The fungicidal composition optionally further comprises one or more polymeric stabilizer. The suitable polymeric stabilizers that may be used in the present invention include, but are not limited to, polypropylene, polyisobutylene, polyisoprene, copolymers of monoolefins and diolefins, polyacrylates, polystyrene, polyvinyl acetate, polyurethanes or polyamides. Suitable stabilizers are known in the art and commercially available.

The surfactants and polymeric stabilizers mentioned above are generally believed to impart stability to the composition, in turn allowing the composition to be formulated, stored, transported and applied.

Suitable anti-foams include all substances which can normally be used for this purpose in agrochemical compositions. Suitable anti-foam agents are known in the art and are available commercially. Particularly preferred antifoam agents are mixtures of polydimethylsiloxanes and perfluroalkylphosphonic acids, such as the silicone anti-foam agents available from GE or Compton.

Suitable organic solvents are selected from all customary organic solvents which thoroughly dissolve the agrochemically active substances employed. Again, suitable organic solvents for the active ingredients (A), (B) and (C) are known in the art. The following may be mentioned as being preferred: N-methyl pyrrolidone, N-octyl pyrrolidone, cyclohexyl-1-pyrrolidone; or Solvesso 200, a mixture of paraffinic, isoparaffinic, cycloparaffinic and aromatic hydrocarbons. Suitable solvents are commercially available.

Suitable preservatives include all substances which can normally be used for this purpose in agrochemical compositions of this type and again are well known in the art. Suitable examples that may be mentioned include Preventol® (from Bayer AG) and Proxel® (from Bayer AG).

Suitable antioxidants are all substances which can normally be used for this purpose in agrochemical compositions, as is known in the art. Preference is given to butylated hydroxytoluene.

Suitable thickeners include all substances which can normally be used for this purpose in agrochemical compositions. For example xanthan gum, PVOH, cellulose and its derivatives, clay hydrated silicates, magnesium aluminum silicates or a mixture thereof. Again, such thickeners are known in the art and available commercially.

In addition, depending upon the formulation, the composition according to the invention may also comprise water.

In a preferred embodiment, compositions according to the present invention comprise the following combinations of active ingredients:

(A) tebuconazole, (B) azoxystrobin, (C) carbendazim;
(A) azaconazole, (B) dimoxystrobin, (C) benomyl;
(A) cyproconazole, (B) famoxadone, (C) fuberidazole;
(A) hexaconazole, (B) fenamidone, (C) thiabendazole;
(A) penconazole, (B) fluoxastrobin, (C) thiophanate-methyl;
(A) tetraconazole, (B) kresoxim-methyl, (C) carbendazim;
(A) tebuconazole, (B) metominostrobin, (C) carbendazim;
(A) triticonazole, (B) picoxystrobin, (C) thiabendazole;
(A) simeconazole, (B) pyraclostrobin, (C) carbendazim; or
(A) fenbuconazole, (B) trifloxystrobin, (C) carbendazim.

Each of the compositions of the present invention can be used in the agricultural sector and related fields of use for controlling or preventing disease, infestation and/or pest damage on plants.

Each of the compositions according to the present invention is effective against phytopathogenic fungi, especially occurring in plants, especially in soybean plants, such pathogenic infestations including Soybean rust (*Phakopsora pachyrhizi*); Anthracnose (*Colletotrichum truncatum*); Powdery mildew (*Erysiphe diffusa*); Soybean powdery mildew (*Microsphaera diffusa*); Soybean Brown Spot (*Septoria glycines*); End Cycle disease-leaf blight (*Cercospora kikuchii*); Downy mildew (*Peronospora manshurica*).

The compositions of the present invention are particularly effective against fungal pathogens causing soybean rust.

The composition according to the present invention is suitable for plants of the crops: cereals (wheat, barley, rye, oats, corn, rice, sorghum, triticale and related crops); beet (sugar beet and fodder beet); leguminous plants (beans, lentils, peas, soybeans); oil plants (rape, mustard, sunflowers); cucumber plants (marrows, cucumbers, melons); fibre plants (cotton, flax, hemp, jute); vegetables (spinach, lettuce, asparagus, cabbages, carrots, onions, tomatoes, potatoes, paprika); as well as ornamentals (flowers, shrubs, broad-leaved trees and evergreens, such as conifers). Especially suitable are wheat, barley, rye, oats, triticale, corn, and soybean; each composition is advantageously preferred for the crops and soybean.

The composition of the present invention may contain or be mixed with other pesticides, such as other fungicides, insecticides and nematicides.

The rates of application (use) of the composition of the present invention vary, for example, according to type of use, type of crop, the specific active ingredient in the combination, type of plants, but is such that the active ingredients in the combination is an effective amount to provide the desired action (such as disease or pest control). The application rate of the composition for a given set of conditions can readily be determined by trials.

Generally for soybean treatment, application rates can vary from 0.01 kg to 3 kg per hectare (kg/ha) of active ingredients. For example, suitable application rates for soybean use may be 40-200 g/ha of compound (A); 10-100 g/ha of compound (B); and 100-400 g/ha of compound (C).

In the event the composition comprises (A) tebuconazole, (B) azoxystrobin, and (C) carbendazim, typical application rates for soybean treatment may be 70-100 g/ha of tebuconazole, 30-60 g/ha of azoxystrobin, and 200-300 g/ha carbendazim.

The components (A), (B) and (C), and any other pesticides, may be applied and used in pure form, as a solid active ingredient, for example, in a specific particle size, or preferably together with at least one of the auxiliary or adjuvant components, as is customary in formulation technology, such as extenders, for example solvents or solid carriers, or surface-active compounds (surfactants), as described in more detail above. Generally, the compounds (A), (B), and (C) are in the form of a formulation composition with one or more of the aoforementioned customary formulation auxiliaries.

As described above, the present invention also provides a method in which a plant or a locus is treated with each of the active ingredients (A), (B) and (C). The active compounds (A), (B) and (C) can be applied to the locus where control is desired either simultaneously or in succession at short intervals, for example on the same day. The active components (A), (B) and (C) may be applied in any suitable form, as described above. Typically, the active components will be applied as formulations, that is compositions comprising one or more of the active components together with further carriers, surfactants or other application-promoting adjuvants customarily employed in formulation technology. In a preferred embodiment, compound (A), (B), and (C) are applied simultaneously, in particular by way of a composition of the present invention.

The active compounds (A), (B) and (C) may be applied to the plant or locus in any order. Each compound may be applied just once or a plurality of times. Preferably, each of the active compounds (A), (B) and (C) are applied a plurality of times, in particular from 2 to 5 times, more preferably 3 times.

The active compounds (A), (B) and (C) may be applied in any amounts relative to each other, in order to obtain the enhanced or synergistic effect of the combination. In particular, the relative amounts of the compounds to be applied to the plant or locus are as hereinbefore described, with the ratio of any two of (A), (B) and (C) preferably being in the range of from 25:1 to 1:25, 20:1 to 1:20 and 15:1 to 1:15, more preferably from 10:1 to 1:10 or 5:1 to 1:5.

In the event compounds (A), (B) and (C) are applied simultaneously in the present invention, they may be applied as a composition containing (A), (B) and (C), in which case (A), (B) and (C) can be obtained from a separate formulation source and mixed together (known as a tank-mix, ready-to-apply, spray broth, or slurry), optionally with other pesticides, or (A), (B) and (C) can be obtained as a single formulation mixture source (known as a pre-mix, concentrate, formulated compound (or product)), and optionally mixed together with other pesticides.

In an embodiment, the combination of the active components (A), (B) and (C) applied by way of the method of the present invention is applied as a composition, as hereinbefore described. Accordingly, the present invention is a composition comprising as active ingredients, components (A), (B) and (C), and optionally other pesticides, and optionally one or more customary formulation auxiliaries; which may be in the form of a tank-mix or pre-mix composition.

Generally, a tank-mix formulation comprises 0.1 to 20%, especially 0.1 to 15%, active ingredient compounds, and 99.9 to 80%, especially 99.9 to 85%, of one or more solid or liquid auxiliaries (including for example, a solvent such as water), where the auxiliaries can be surfactant in an amount of 0 to 20%, especially 0.1 to 15%, based on the tank-mix formulation.

Typically, a pre-mix formulation comprises 0.1 to 99.9%, especially 1 to 95%, active ingredient compounds, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

In a preferred embodiment of the invention, the combinations of:
(A) tebuconazole, (B) azoxystrobin, (C) carbendazim;
(A) azaconazole, (B) dimoxystrobin, (C) benomyl;
(A) cypraconazole, (B) famoxadone, (C) fuberidazole;
(A) hexaconazole, (B) fenamidone, (C) thiabendazole;
(A) penconazole, (B) fluoxastrobin, (C) thiophanate-methyl;
(A) tetraconazole, (B) kresoxim-methyl, (C) carbendazim;
(A) tebuconazole, (B) metominostrobin, (C) carbendazim;
(A) triticonazole, (B) picoxystrobin, (C) thiabendazole;
(A) simeconazole, (B) pyraclostrobin, (C) carbendazim;
(A) fenbuconazole, (B) trifloxystrobin, (C) carbendazim
are each provided in the form of a pre-mix composition (or mixture).

In a particular embodiment, each of the active components (A), (B) and (C) in the combination independently may be one or more than one active compounds. In a further particular embodiment, the composition of the invention comprises, in addition to the combination of the active components, one or more further active ingredients, and optionally suitable adjuvant and/or auxiliary.

Each and/or any technical feature of one embodiment of the present invention may be freely and independently combined with any other embodiment of the present invention. That is, one or more of the technical features of any embodiment of the present invention may be recombined with any other technical feature. Thus-obtained embodiments by recombination of technical features are disclosed herein as if they are particularly recited herein.

Examples of formulation types for pre-mix compositions are:
EW: emulsions, oil in water
ME: micro-emulsion
SC: aqueous suspension concentrate
CS: aqueous capsule suspension
OD: oil-based suspension concentrate, and
SE: aqueous suspo-emulsion Using such formulations, either straight (that is undiluted) or diluted with a suitable solvent, especially water, plants and loci can be treated and protected against damage, for example by pathogen(s), by spraying, pouring or immersing.

The active ingredient combinations according to the invention are distinguished by the fact that they are especially well tolerated by plants and are environmentally friendly.

Each active ingredient combination according to the invention is especially advantageous for the treatment of plants.

The following examples are given by way of illustration and not by way of limitation of the invention.

PREPARATION EXAMPLES

Example 1

An aqueous suspension concentrate was prepared having the following composition:

| | |
|---|---|
| Tebuconazole | 50 g |
| Azoxystrobin | 300 g |
| Carbendazim | 50 g |
| Propylene glycol | 100 g |
| Tristyrylphenol ethoxylates | 50 g |

-continued

| | |
|---|---|
| Sodium lignosulfonate | 100 g |
| Carboxymethylcellulose | 10 g |
| Silicone oil (in the form of a 75% emulsion in water) | 10 g |
| Water | to 1 L |

The finely ground active ingredients were intimately mixed with the adjuvants, giving a suspension concentrate from which suspensions of any desired dilution could be obtained by dilution with water. As an alternative, a suspension of the active ingredients and auxiliaries (including water) was wet milled with a bead-mill to achieve a stable formulation with the appropriate treatment characteristics.

Example 2

An aqueous suspension concentrate was prepared having the following composition:

| | |
|---|---|
| Tebuconazole | 165 g |
| Azoxystrobin | 75 g |
| Carbendazim | 36 g |
| Propylene glycol | 100 g |
| Tristyrylphenol ethoxylates | 50 g |
| Sodium lignosulfonate | 100 g |
| Carboxymethylcellulose | 10 g |
| Silicone oil (in the form of a 75% emulsion in water) | 10 g |
| Water | to 1 L |

The finely ground active ingredients were intimately mixed with the auxiliaries, giving a suspension concentrate from which suspensions of any desired dilution could be obtained by dilution with water. As an alternative, a suspension of the active ingredients and auxiliaries (including water) was wet milled with a bead-mill to achieve a stable formulation and with the appropriate treatment characteristics.

Example 3

A suspo-emulsion was prepared having the following composition:

| | |
|---|---|
| Tebuconazole | 400 g |
| Azoxystrobin | 10 g |
| Carbendazim | 200 g |
| N-methylpyrrolidone | 100 g |
| Alkamuls OR/36 | 30 g |
| Polyerethanes | 20 g |
| Tersperse 2500 | 2.5 g |
| Soprophor FLK | 10 g |
| Propylene glycol | 100 g |
| 2% xanthan gum | 75 g |
| Silicone oil (in the form of a 75% emulsion in water) | 10 g |
| Water | to 1 L |

The active ingredient tebuconazole was mixed with N-methyl pyrrolidone and the emulsifiers OR/36 and polymeric stabilizer polyurethanes to get an oil phase. The finely ground active ingredients azoxystrobin and carbendazim were intimately mixed with the other auxiliaries (including water), giving a water phase. As an alternative, a suspension of the active ingredients and auxiliaries (including water) was wet milled with a bead-mill to achieve a water phase. The oil phase was added to water phase under continuous agitation for an optimum amount of time.

Example 4

A suspo-emulsion was prepared having the following composition:

| | |
|---|---|
| Epoxiconazole | 50 g |
| Pyraclostrobin | 40 g |
| Carbendazim | 500 g |
| N-methylpyrrolidone | 100 g |
| Alkamuls OR/36 | 30 g |
| Polyerethanes | 20 g |
| Tersperse 2500 | 2.5 g |
| Soprophor FLK | 10 g |
| Propylene glycol | 100 g |
| 2% xanthan gum | 75 g |
| Silicone oil (in the form of a 75% emulsion in water) | 10 g |
| Water | to 1 L |

The active ingredient epoxiconazole was mixed with N-methyl pyrrolidone and the emulsifiers OR/36 and polymeric stabilizer polyurethanes to get an oil phase. The finely ground active ingredients pyraclostrobin and carbendazim were intimately mixed with the other auxiliaries (including water), giving a water phase. As an alternative, a suspension of the active ingredients and auxiliaries (including water) was wet milled with a bead-mill to achieve a water phase. The oil phase was added to water phase under continuous agitation for an optimum amount of time.

Example 5

An aqueous suspension concentrate was prepared having the following composition:

| | |
|---|---|
| Cyproconaozle | 100 g |
| Azoxystrobin | 50 g |
| Carbendazim | 400 g |
| Propylene glycol | 100 g |
| Tristyrylphenol ethoxylates | 50 g |
| Sodium lignosulfonate | 100 g |
| Carboxymethylcellulose | 10 g |
| Silicone oil (in the form of a 75% emulsion in water) | 10 g |
| Water | to 1 L |

The finely ground active ingredients were intimately mixed with the auxiliaries, giving a suspension concentrate from which suspensions of any desired dilution could be obtained by dilution with water. As an alternative, a suspension of the active ingredients and auxiliaries (including water) was wet milled with a bead-mill to achieve a stable formulation and with the appropriate treatment characteristics.

Example 6

An oil-based suspension concentrate was prepared having the following composition:

| | |
|---|---|
| Cyproconaozle | 200 g |
| Azoxystrobin | 100 g |
| Carbendazim | 300 g |
| Propylene glycol | 100 g |
| Tristyrylphenol ethoxylates | 50 g |

-continued

| | |
|---|---|
| Sodium lignosulfonate | 100 g |
| Carboxymethylcellulose | 10 g |
| Silicone oil (in the form of a 75% emulsion in water) | 10 g |
| Vegetable oil | to 1 L |

The finely ground active ingredients were intimately mixed with the auxiliaries, giving a suspension concentrate from which suspensions of any desired dilution could be obtained by dilution with water.

BIOLOGICAL EXAMPLES

Field Evaluation 1

A composition prepared according to Example 1 was evaluated in the field in comparison with commercial formulations containing the same active ingredients. Details of the evaluation procedure are set out in the following table.

| | Treatment Details | | |
|---|---|---|---|
| Number | Treatment Composition | Dosages (l/ha) | Dosages (g ai/ha) (ai: active ingredient) |
| Control | Untreated Control | — | — |
| 1 | Tebuconaozle 250 g/L EC | 0.4 | 100 tebuc. |
| 2 | Carbendazim 500 g/L SC | 0.5 | 250 carben. |
| 3 | Azoxystrobin 250 g/L SC | 0.16 | 40 azoxy. |
| 4 | Example 1 | 1 | 50 tebuc. + 300 azoxy. + 50 carben. |

The above treatments were applied against soybean rust. Outdoors, soybeans were sprayed with the active compound preparations at an application rate such that the amounts of active compounds stated in the above table were applied per hectare.

The second application was done at 14 days after the first application. The third application was done at 22 days after the second application. The first assessment was carried out at 14 days after the first application. The second assessment was carried out at 16 days after the second application. The third assessment was carried out at 19 days after the third application. Ten leaves were collected per plot, on 2 central lines, from the central area of the plants. The rust was assessed by determining the severity of rust of the plants and expressing it in percent. The severity grade was determined according to the Diagrammatic Scale for Soybean Rust of EMBRAPA (Brazilian Agricultural Research Corporation).

Upon the first application, Rust was already present in the area, with a Severity of 1.77%.

| | Result 1 | | |
|---|---|---|---|
| Treatment | Severity (%) of Rust/1st Assessment-14 DA1A | Severity (%) of Rust/2nd Assessment-16 DA2A | Severity (%) of Rust/3rd Assessment -28 DA3A |
| 1 | 0.31 | 0.48 | 9.36 |
| 2 | 2.14 | 29.35 | 67.33 |
| 3 | 0.58 | 1.93 | 22.08 |
| 4 | 0.25 | 0.25 | 8.45 |

Conclusion 1

Upon the $1^{st}$ Assessment, $2^{nd}$ Assessment, and $3^{rd}$ Assessment, it was noted that the treatments with the formulation of Example 1 were better in performance than 250 g/L tebuconazole EC alone, and much higher than 500 g/L carbendazim SC alone and 250 g/L azoxystrobin SC alone.

Field Evaluation 2

A composition according to Example 2 was evaluated in the field in comparison with commercial formulations containing the same active ingredients. Details of the evaluation procedure are set out in the following table.

| | Treatment Details | | |
|---|---|---|---|
| Number | Treatment Composition | Dosages (l/ha) | Dosages (g ai/ha) |
| Control | Untreated Control | — | — |
| 1 | Tebuconaozle 250 g/L EC | 0.32 | 80 tebuc. |
| 2 | Carbendazim 500 g/L SC | 0.5 | 250 carben. |
| 3 | Azoxystrobin 250 g/L SC | 0.20 | 50 azoxy. |
| 4 | Example 2 | 1 | 165 tebuc. + 75 azoxy. + 360 carben. |

The above treatments were applied against soybean rust. Outdoors, soybeans were sprayed with the active compound preparations at an application rate such that the amounts of active compounds stated in the above table were applied per hectare.

The second application was done at 14 days after the first application. The third application was done at 22 days after the second application. The first assessment was carried out at 14 days after the first application. The second assessment was carried out at 16 days after the second application. The third assessment was carried out at 19 days after the third application. Ten leaves were collected per plot, on 2 central lines, from the central area of the plants. The rust was assessed by determining the severity of rust of the plants and expressing it in percent. The severity grade was determined according to the Diagrammatic Scale for Soybean Rust of EMBRAPA (Brazilian Agricultural Research Corporation).

Upon the first application, Rust was already present in the area, with a Severity of 1.77%.

| | Result 2 | | |
|---|---|---|---|
| Treatment | Severity(%) of Rust/1st Assessment-14 DA1A | Severity(%) of Rust/2nd Assessment-16 DA2A | Severity(%) of Rust/3rd Assessment-28 DA3A |
| 1 | 0.34 | 0.36 | 9.89 |
| 2 | 2.14 | 29.35 | 67.33 |
| 3 | 0.45 | 1.28 | 20.54 |
| 4 | 0.25 | 0.23 | 7.46 |

Conclusion 2

Upon the $1^{st}$ Assessment, $2^{nd}$ Assessment, and $3^{rd}$ Assessment, it was noted that the treatments with the formulation of Example 2 were better in performance than 250 g/L tebuconazole EC alone, and much higher than 500 g/L carbendazim SC alone and 250 g/L azoxystrobin SC alone.

Field Evaluation 3

A composition according to Example 4 was evaluated in the field in comparison with commercial formulations containing the same active ingredients. Details of the evaluation procedure are set out in the following table.

| | Treatment Details | | |
|---|---|---|---|
| Number | Treatment Composition | Dosages (l/ha) | Dosages (g ai/ha) |
| Control | Untreated Control | — | — |
| 1 | Carbendazim 500 g/L SC | 0.5 | 250 carben. |
| 2 | Epoxiconazole 400 g/L + pyraclostrobin 10 g/L SE | 1 | 400 epoxico. + 10 pyraclo. |
| 3 | Example 3 | 1 | 400 epoxico. + 10 pyraclo. + 200 carben. |

The above treatments were applied against soybean rust. Outdoors, soybeans were sprayed with the active compound preparations at an application rate such that the amounts of active compounds stated in the above table were applied per hectare.

The second application was done at 14 days after the first application. The third application was done at 22 days after the second application. The first assessment was carried out at 14 days after the first application. The second assessment was carried out at 16 days after the second application. The third assessment was carried out at 19 days after the third application. Ten leaves were collected per plot, on 2 central lines, from the central area of the plants. The rust was assessed by determining the severity of rust of the plants and expressing it in percent. The severity grade was determined according to the Diagrammatic Scale for Soybean Rust of EMBRAPA (Brazilian Agricultural Research Corporation).

Upon the first application, Rust was already present in the area, with a Severity of 1.77%.

| | Result 3 | | |
|---|---|---|---|
| Treatment | Severity(%) of Rust/1$^{st}$ Assessment-14 DA1A | Severity(%) of Rust/2nd Assessment-16 DA2A | Severity(%) of Rust/3rd Assessment-28 DA3A |
| 1 | 2.14 | 29.35 | 67.33 |
| 2 | 1.46 | 25.36 | 45.67 |
| 3 | 0.47 | 1.26 | 18.67 |

Conclusion 3

Upon the 1$^{st}$ Assessment, 2$^{nd}$ Assessment, and 3$^{rd}$ Assessment, it was noted that the treatments with the formulation of Example 3 were better in performance than Epoxiconazole 400 g/L+pyraclostrobin 10 g/L SE, and much higher than 500 g/L carbendazim SC alone.

Field Evaluation 4

A composition according to Example 5 was evaluated in the field in comparison with commercial formulations containing the same active ingredients. Details of the evaluation procedure are set out in the following table.

| | Treatment Details | | |
|---|---|---|---|
| Number | Treatment Composition | Dosages (l/ha) | Dosages (g ai/ha) |
| Control | Untreated Control | — | — |
| 1 | Carbendazim 500 g/L SC | 0.5 | 250 carben. |
| 2 | Cyproconazole 50 g/L + Azoxystrobin 40 g/L SC | 1 | 50 Cypro. + 40 azoxy. |
| 3 | Example 4 | 1 | 50 Cypro. + 40 azoxy. + 500 carben. |

The above treatments were applied against soybean rust. Outdoors, soybeans were sprayed with the active compound preparations at an application rate such that the amounts of active compounds stated in the above table were applied per hectare.

The second application was done at 14 days after the first application. The third application was done at 22 days after the second application. The first assessment was carried out at 14 days after the first application. The second assessment was carried out at 16 days after the second application. The third assessment was carried out at 19 days after the third application. Ten leaves were collected per plot, on 2 central lines, from the central area of the plants. The rust was assessed by determining the severity of rust of the plants and expressing it in percent. The severity grade was determined according to the Diagrammatic Scale for Soybean Rust of EMBRAPA (Brazilian Agricultural Research Corporation).

Upon the first application, Rust was already present in the area, with a Severity of 1.77%.

| | Result 4 | | |
|---|---|---|---|
| Treatment | Severity(%) of Rust/1$^{st}$ Assessment-14 DA1A | Severity(%) of Rust/2nd Assessment-16 DA2A | Severity(%) of Rust/3rd Assessment-28 DA3A |
| 1 | 2.14 | 29.35 | 67.33 |
| 2 | 2.08 | 23.05 | 50.76 |
| 3 | 0.25 | 1.98 | 16.08 |

Conclusion 4

Upon the 1$^{st}$ Assessment, 2$^{nd}$ Assessment, and 3$^{rd}$ Assessment, it was noted that the treatments with the formulation of Example 4 were better in performance than Cyproconazole 50 g/L+Azoxystrobin 40 g/L SC, and much higher than 500 g/L carbendazim SC alone.

The experimental data show that the method and compositions of the present invention provide advantageous properties in the treatment of pathogenic or pest infestations of plants, in particular fungal infestations of plants, such as soybean. These properties are for example the synergistically enhanced action of combinations of compounds (A), (B) and (C), resulting in lower pathogenic damage and/or pest damage, lower rates of application, or a longer duration of action. In the instance of agriculture, the enhanced action is found to show an improved in the growing characteristics of a plant by, for example, higher than expected control of the pathogenic infestation and/or pest damage.

The invention claimed is:

1. A fungicidal composition comprising at least three active ingredient components (A), (B) and (C), optionally together with one or more customary formulation auxiliaries, wherein:
   component (A) is a triazole fungicide, wherein the triazole is between 5% and 40% by weight of the composition;
   component (B) is a strobilurin fungicide, wherein the strobilurin is between 1% and 30% by weight of the composition; and
   component (C) is a benzimidazole fungicide, wherein the benzimidazole is between 5% and 50% by weight of the composition;
   wherein (A) is tebuconazole, (B) is azoxystrobin, and (C) is carbendazim.

2. The fungicidal composition according to claim 1, wherein tebuconazole is between 5% and 20% by weight of the composition, azoxystrobin is between 4% and 10% by weight of the composition, and carbendazim is between 20% and 40% by weight of the composition.

3. The fungicidal composition according to claim 1, wherein tebuconazole is between 10% and 20% by weight of the composition, azoxystrobin is between 5% and 10% by weight of the composition, and carbendazim is between 30% and 40% by weight of the composition.

4. The fungicidal composition according to claim 1, wherein the composition is a suspension concentrate or a suspo-emulsion.

5. The fungicidal composition according to claim 1, wherein the composition is a suspension concentrate or a suspo-emulsion, tebuconazole is between 10% and 20% by weight of the composition, azoxystrobin is between 5% and 10% by weight of the composition, and carbendazim is between 30% and 40% by weight of the composition.

6. The fungicidal composition according to claim 4, wherein the composition is an aqueous suspension concentrate.

7. The fungicidal composition according to claim 1, wherein the components (A), (B) and (C) are present in amounts such that the ratio of any two of the components is from 25:1 to 1:25, from 20:1 to 1:20, from 15:1 to 1:15, or from 10:1 to 1:10.

8. A method for the treatment of pathogenic or pest damage to plants or plant material, comprising applying a composition according to claim 1 on the plant, plant material, part of the plant, or surroundings thereof.

9. The method according to claim 8, wherein the plant is soybean.

10. The method according to claim 9, wherein the pest damage is soybean rust.

11. The method according to claim 8, wherein the components (A), (B) and (C) are applied in amounts such that the ratio of any two of the components is from 25:1 to 1:25, from 20:1 to 1:20, from 15:1 to 1:15, or from 10:1 to 1:10.

* * * * *